US012258929B1

(12) United States Patent
Gremillion

(10) Patent No.: US 12,258,929 B1
(45) Date of Patent: Mar. 25, 2025

(54) METHOD AND APPARATUS FOR SEALING A SPARK PLUG WELL

(71) Applicant: Paul J. Gremillion, Slidell, LA (US)

(72) Inventor: Paul J. Gremillion, Slidell, LA (US)

( * ) Notice: Subject to any disclaimer, the term of this patent is extended or adjusted under 35 U.S.C. 154(b) by 0 days.

(21) Appl. No.: 18/237,973

(22) Filed: Aug. 25, 2023

Related U.S. Application Data

(60) Provisional application No. 63/395,402, filed on Aug. 5, 2022.

(51) Int. Cl.
*F02P 13/00* (2006.01)
*F02F 11/00* (2006.01)

(52) U.S. Cl.
CPC ............... *F02P 13/00* (2013.01); *F02F 11/00* (2013.01); *F02F 11/002* (2013.01)

(58) Field of Classification Search
CPC .... F02P 13/00; F02F 1/24; F02F 11/00; F02F 11/002; F02B 77/00; F02B 77/005
See application file for complete search history.

(56) References Cited

U.S. PATENT DOCUMENTS

| | | | | | |
|---|---|---|---|---|---|
| 1,479,129 | A * | 1/1924 | Feilner | F02F 1/40 | 123/41.79 |
| 2,234,780 | A * | 3/1941 | Rippingille | F02F 1/242 | 123/41.31 |
| 4,030,470 | A * | 6/1977 | Betts | F02F 1/08 | 123/193.2 |
| 4,034,723 | A * | 7/1977 | Hamparian | F02B 77/02 | 123/193.5 |
| 4,106,444 | A * | 8/1978 | Deutschmann | F02F 1/166 | 123/193.5 |
| 4,112,906 | A * | 9/1978 | Spencer | F02F 1/38 | 123/193.5 |
| 4,229,867 | A * | 10/1980 | Spencer | F02F 1/166 | 29/888.011 |
| 5,295,462 | A * | 3/1994 | Barnes | F02F 11/00 | 123/193.5 |
| 5,609,129 | A * | 3/1997 | Hauf | F02F 7/006 | 123/193.5 |
| 6,138,637 | A * | 10/2000 | Bubeck | F02B 23/101 | 123/169 PA |
| 6,675,760 | B1 * | 1/2004 | Gahrken | F02F 1/4214 | 123/169 PA |
| 2008/0276918 | A1 * | 11/2008 | Skinner | F02P 13/00 | 123/635 |
| 2009/0308368 | A1 * | 12/2009 | Na | H01T 13/08 | 123/647 |
| 2011/0083628 | A1 * | 4/2011 | Kishi | H01T 13/06 | 123/143 C |

FOREIGN PATENT DOCUMENTS

| | | | | |
|---|---|---|---|---|
| CN | 201318242 | Y | * | 9/2009 |
| CN | 101956624 | A | * | 1/2011 |
| CN | 201972809 | U | * | 9/2011 |
| CN | 210660329 | U | * | 6/2020 |
| CN | 115199452 | A | * | 10/2022 |
| GB | 119637 | A | * | 10/1918 |

* cited by examiner

*Primary Examiner* — John M Zaleskas
(74) *Attorney, Agent, or Firm* — Kenneth L. Tolar

(57) ABSTRACT

A method and apparatus for sealing a sparkplug well to prevent oil intrusion includes a sleeve that is dimensioned and configured to firmly fit within the well interior. A user removes the engine coils, cleans the spark plug well, applies a sealant to the sleeve exterior and the inner wall of the sparkplug well, inserts the sleeve into the well, and reinstalls the coils once the sealant has dried.

10 Claims, 3 Drawing Sheets

FIG. 3
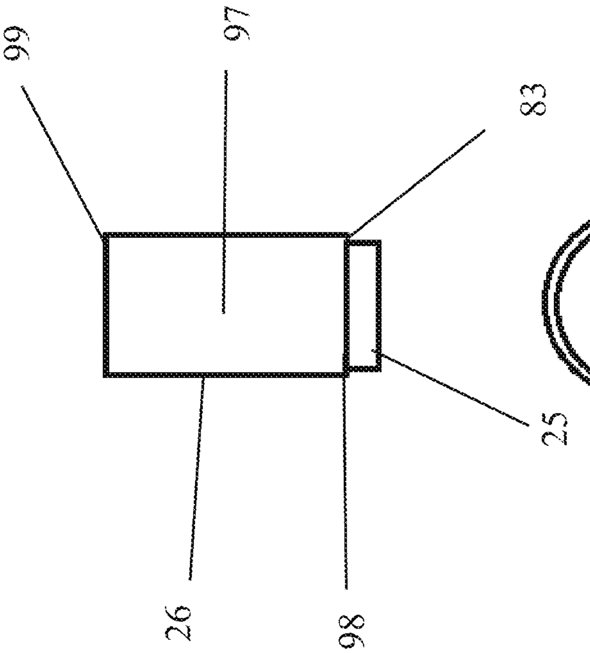
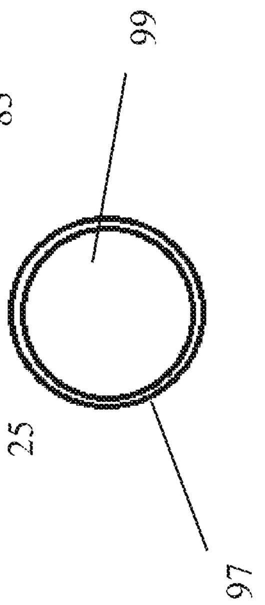
FIG. 4

METHOD AND APPARATUS FOR SEALING A SPARK PLUG WELL

CROSS REFERENCE TO RELATED APPLICATIONS

This application claims priority of provisional application No. 63/395,402 filed on Aug. 5, 2022, the specification of which is incorporated herein by reference.

BACKGROUND OF THE INVENTION

The present invention relates to a method and apparatus for sealing oil leaking into the spark plug well of a cylinder head.

DESCRIPTION OF THE PRIOR ART

A spark plug delivers an electric current from an ignition system to the combustion chamber of an engine to ignite a mixture of compressed fuel and air. The spark plug typically includes a threaded metallic shell and a central electrode separated by a ceramic insulator. The central electrode is electrically connected to the output terminal of an ignition coil or magneto and the metallic shell is threaded into a bore on the bottom surface of the cylinder head.

Certain engines manufactured by Audi AG have cylinder heads with a cam girdle superimposed thereon. The cam girdle includes tubes that mate with spark plug wells in the cylinder head that form a joint that is susceptible to fluid intrusion. Though a sealant or a gasket is used to seal the joint to prevent any fluid intrusion, the sealant or gasket eventually fails and allows oil from the lubricant system to leak into the well and engage the spark plug. The leaked oil is not only messy but also creates a significant fire hazard. In order to separate the upper section from the lower section and replace the faulty sealant, a worker must disassemble the top of the engine, which is extremely laborious and results in exorbitant repair costs.

Accordingly, there is currently a need for a more efficient method of repairing spark plug well leaks. The present invention addresses this need by providing a sleeve that fits within a leaking spark plug well to prevent oil intrusion.

SUMMARY OF THE INVENTION

A method and apparatus for sealing a spark plug well to prevent oil intrusion includes a sleeve that is dimensioned and configured to firmly fit within the well interior. A user removes the engine coils, cleans the spark plug well, applies a sealant to the sleeve exterior and the inner wall of the spark plug well, inserts the sleeve into the well, and reinstalls the coils once the sealant has dried.

It is therefore an object of the disclosed device to quickly and easily seal a spark plug well.

It is therefore another object of the disclosed device to repair a leaking spark plug well with minimal labor.

It is therefore yet another object of the disclosed device to provide a method of repairing a leaking spark plug well that eliminates the burdensome practice of dismantling an engine.

Other objects, features, and advantages of the present invention will become readily apparent from the following detailed description of the preferred embodiment when considered with the attached drawings and the appended claims.

BRIEF DESCRIPTION OF THE DRAWINGS

FIG. 3 is an isolated, front view of the sleeve.

FIG. 4 is an isolated, top view of the sleeve.

DESCRIPTION OF THE PREFERRED EMBODIMENT

Figure 1:
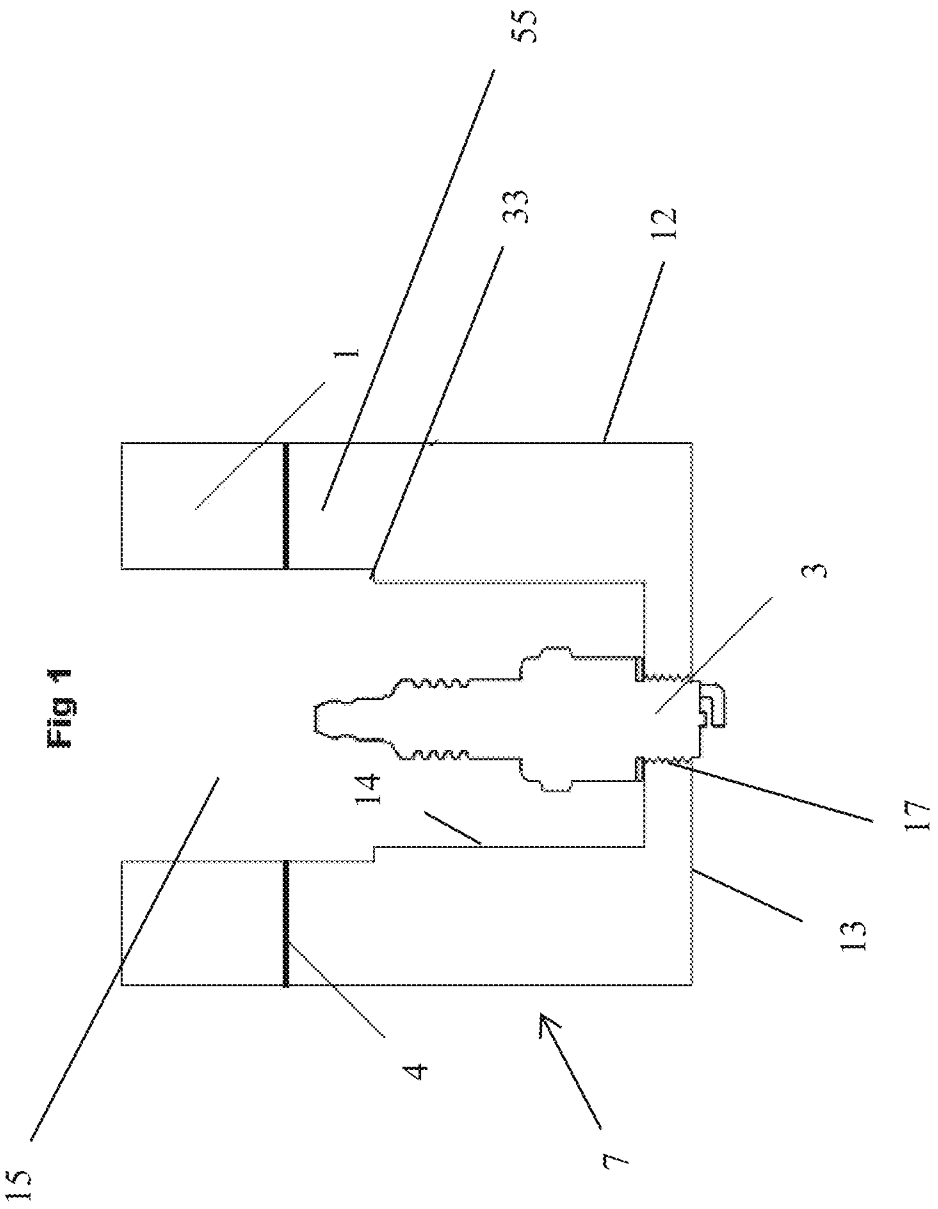
Fig 1 PRIOR ART
FIG. 1 is a cutaway view of a typical spark plug well with a spark plug installed therein.

Now referring specifically to FIG. 1, engines typically include a cylinder head that houses spark plugs, cam shafts, coils, and other engine components. The spark plugs are each secured within a corresponding spark plug well 7 in the cylinder head. Each spark plug well 7 has a continuous outer wall 12, a bottom surface 13, and a continuous inner wall 14 that defines an interior chamber 15. The diameter of the inner wall widens near an upper end 55 to form a shoulder 33. A spark plug 3 is received within the interior chamber and is threadedly coupled with a bore 17 on the bottom surface 13 of the well 7. A cam girdle is superimposed on the cylinder head to enclose and secure the engine components within the cylinder head. The cam girdle includes multiple tubes 1 on a lower surface that each mate with the upper end of a corresponding spark plug well 7, such that the resulting spark plug well has an upper section a lower section. The mating sections form an interposed joint 4 positioned above the shoulder 33 that is susceptible to fluid penetration. During engine fabrication, a sealant is typically applied to the joint 4 to prevent fluid intrusion into the well 7.

Figure 2:
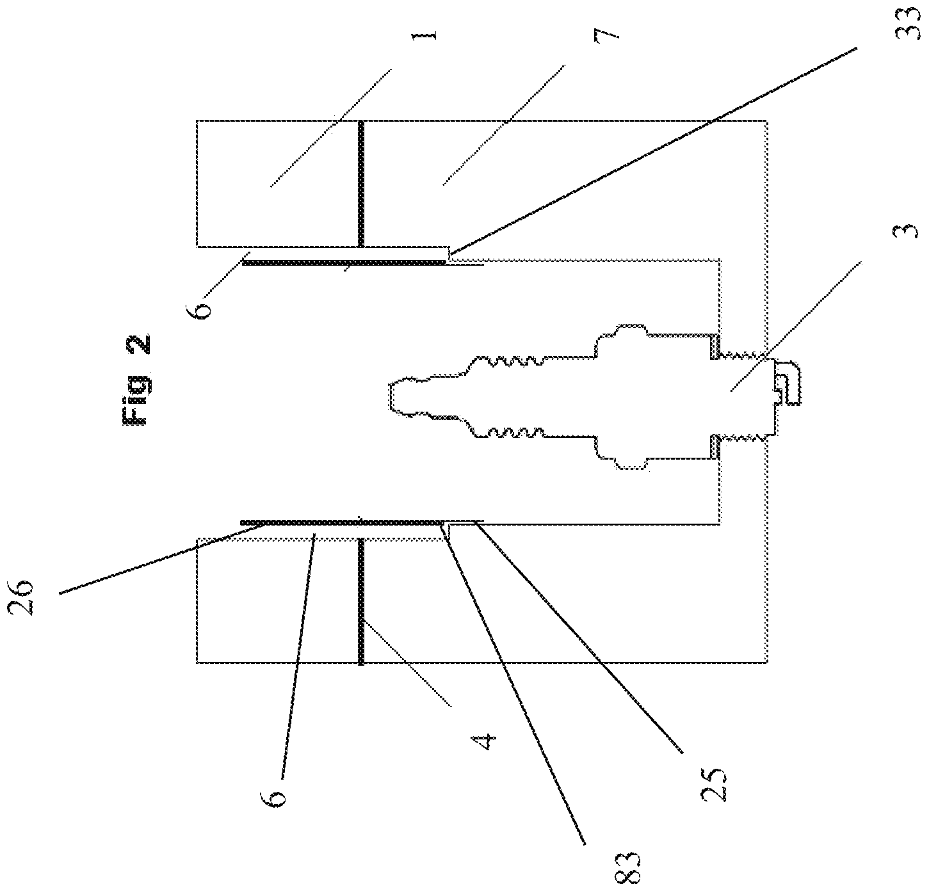
FIG. 2 depicts the spark plug well of FIG. 1 with the sleeve according to the present invention installed therein.

Now referring specifically to FIGS. 2-4, disclosed herein are a method and apparatus for sealing the spark plug wells described above to prevent fluid leakage into the interior chamber 15. The apparatus includes a sleeve 26 having an upper end 99, a lower end 98 and a continuous outer wall 97. The sleeve 26 is dimensioned to fit within the wider portion of the spark plug well and the cam girdle tubes, while creating a small annular space 6 therebetween for receiving a sealant. Depending from the lower end of the sleeve is a smaller diameter annulus 25 that is dimensioned and configured to firmly fit within the narrower portion of the spark plug well. The annulus 25 forms a rim 83 on the lower end of the sleeve for resting on the shoulder 33.

The method of sealing the spark plug well includes first removing the engine coils from the cylinder head and cleaning any leaked oil from the spark plug wells. A user then applies sealant to the sleeve exterior and the inner wall of the well 7, then inserts the sleeve into the spark plug well with the rim 83 resting on the shoulder 33 to fill the annular space 6 with sealant. The user then removes any excess sealant and reinstalls the coils once the sealant has dried.

The above-described device is not limited to the exact details of construction and enumeration of parts provided herein. Furthermore, the size, shape, and materials of construction of the various components can be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An engine cylinder head comprising:

at least one spark plug well, said spark plug well having an upper section superimposed on a lower section with a separable joint therebetween, an outer wall, a bottom surface, and an inner wall that defines an interior chamber;

a sleeve received within said interior chamber and spaced from said separable joint to form an annular space between said sleeve and the inner wall; and, a sealant received within said annular space for creating a liquid impermeable layer over said separable joint.

2. The engine cylinder head according to claim 1 wherein an upper portion of said inner wall has a wider inner diameter than a lower portion of said inner wall to form a shoulder beneath said separable joint.

3. The engine cylinder head according to claim 2 further comprising a tubular annulus depending from a lower end of said sleeve, said tubular annulus having a smaller outer diameter than an outer diameter of said sleeve.

4. The engine cylinder head according to claim 3 wherein said tubular annulus is adapted to fit within the lower portion of the inner wall.

5. The engine cylinder head according to claim 4 wherein said tubular annulus forms a rim on the lower end of the sleeve that rests on said shoulder.

6. The engine cylinder head according to claim 1 further comprising a spark plug received within the interior chamber and threadedly coupled with a bore on the bottom surface of said spark plug well.

7. The engine cylinder head according to claim 1 wherein the upper section of said spark plug well is disposed on a lower surface of a removable cam girdle.

8. The engine cylinder head according to claim 7 wherein said separable joint is formed between said removable cam girdle and the lower section of said spark plug well.

9. A method of sealing a spark plug well in a cylinder head formed of an upper section and a lower section with a joint therebetween and an internal shoulder beneath said joint, the method comprising the steps of:

applying a sealant to an exterior surface of a sleeve having a smaller diameter annulus at a lower end that forms a rim; and, inserting the sleeve into said spark plug well with the rim resting on the shoulder to place the sealant in a space between the sleeve and the joint.

10. The method according to claim 9 further comprising the steps of removing engine coils from the cylinder head and removing fluid from the spark plug well prior to inserting the sleeve.

* * * * *